(12) United States Patent
Wuerth et al.

(10) Patent No.: US 10,161,169 B2
(45) Date of Patent: Dec. 25, 2018

(54) METHOD AND DEVICE FOR TRANSMITTING ELECTRICAL POWER AND SIGNALS BETWEEN A WALL AND A LEAF PIVOTABLE RELATIVE THERETO

(71) Applicant: DR. HAHN GMBH & CO. KG, Moenchengladbach (DE)

(72) Inventors: Theophil Wuerth, Selters (DE); Burkhard Grosse, Pohlheim (DE)

(73) Assignee: DR. HAHN GMBH & CO. KG, Moenchengladbach (DE)

( * ) Notice: Subject to any disclaimer, the term of this patent is extended or adjusted under 35 U.S.C. 154(b) by 179 days.

(21) Appl. No.: 15/104,982

(22) PCT Filed: Dec. 15, 2014

(86) PCT No.: PCT/EP2014/077739
§ 371 (c)(1),
(2) Date: Jun. 16, 2016

(87) PCT Pub. No.: WO2015/091345
PCT Pub. Date: Jun. 25, 2015

(65) Prior Publication Data
US 2016/0312505 A1     Oct. 27, 2016

(30) Foreign Application Priority Data
Dec. 18, 2013   (DE) .................. 10 2013 114 319

(51) Int. Cl.
*H02J 5/00*        (2016.01)
*H04B 10/25*     (2013.01)
(Continued)

(52) U.S. Cl.
CPC .......... *E05D 11/0081* (2013.01); *H02J 5/005* (2013.01); *H02J 50/10* (2016.02);
(Continued)

(58) Field of Classification Search
CPC ....... E05D 11/0081; H02J 50/10; H02J 5/005; H02J 17/00; H04B 5/0025–5/0037;
(Continued)

(56) References Cited

U.S. PATENT DOCUMENTS

| 5,739,616 A | 4/1998 | Chikaraishi et al. |
| 2012/0242165 A1 | 9/2012 | Herglotz et al. |

(Continued)

FOREIGN PATENT DOCUMENTS

| DE | 39 15 812 A1 | 11/1990 |
| DE | 43 44 071 A1 | 7/1995 |
| EP | 0 908 594 A2 | 4/1999 |

*Primary Examiner* — Hal Kaplan
(74) *Attorney, Agent, or Firm* — Norman B. Thot

(57) ABSTRACT

A method for transmitting electrical power and first and second signals between a wall and a leaf pivotable relative to the wall. The method includes providing a leaf comprising an electric consumer and an electrical signal transmitter, providing a control and evaluation unit on a wall, providing a single power transmitting device, providing a first optocoupler, and providing a second optocoupler. The electrical actuating power and the electrical operating power are transmitted from the wall to the leaf in a galvanically isolated manner via the single power transmitting device. The first signals are transmitted from the leaf to the wall via the first optocoupler so as to regulate the electrical power supplied on the wall according to an actuating and operating power demand. The second signals are transmitted bidirectionally between the control and evaluation unit on the wall and the electric signal transmitter on the leaf via the second optocoupler.

13 Claims, 6 Drawing Sheets

(51) Int. Cl.
  *H04B 10/50* (2013.01)
  *E05D 11/00* (2006.01)
  *H02J 50/10* (2016.01)
(52) U.S. Cl.
  CPC ......... *H04B 10/2504* (2013.01); *H04B 10/50* (2013.01); *E05Y 2900/132* (2013.01)
(58) Field of Classification Search
  CPC . H04B 5/0093; E05Y 2900/132; H01F 38/14; H01F 2038/143
  USPC ....................................................... 307/104
  See application file for complete search history.

(56) References Cited

U.S. PATENT DOCUMENTS

| | | |
|---|---|---|
| 2013/0181542 A1 | 7/2013 | Herglotz et al. |
| 2014/0001878 A1 | 1/2014 | Meyer et al. |
| 2014/0345084 A1 | 11/2014 | Herglotz et al. |

METHOD AND DEVICE FOR TRANSMITTING ELECTRICAL POWER AND SIGNALS BETWEEN A WALL AND A LEAF PIVOTABLE RELATIVE THERETO

CROSS REFERENCE TO PRIOR APPLICATIONS

This application is a U.S. National Phase application under 35 U.S.C. § 371 of International Application No. PCT/EP2014/077739, filed on Dec. 15, 2014 and which claims benefit to German Patent Application No. 10 2013 114 319.9, filed on Dec. 18, 2013. The International Application was published in German on Jun. 25, 2015 as WO 2015/091345 A1 under PCT Article 21(2).

FIELD

The present invention relates to a method and to a device for transmitting electrical power and signals between a wall and a leaf pivotable relative thereto, wherein the electrical power is transmitted with galvanic isolation, in particular inductively.

BACKGROUND

Such a method and such a device have previously been described in DE 39 15 812 A1 where concentrically arranged coils or a cylindrical capacitor are included for the transmission of power. A signal is likewise intended to be transmitted via the coil or the capacitor, or by radio.

This has the disadvantage that during the transmission of signals through the arrangement, which also serves to transmit power, it is not possible to rule out a mutual influence of the transmission. An optimized power transmission also regularly requires a different constructive adaptation of the coil and/or the capacitor than an optimized signal transmission, so that the use of one transmission arrangement is always necessarily a less than optimum compromise. With an inductive data transmission, the data transfer speed is also limited to the maximum transmission frequency.

To remedy this situation, DE 43 44 071 A1 describes carrying out data transmission photo-optically. In the case of a pivotal arrangement of a leaf on a wall, for example, the transmitting and receiving diodes should each be arranged in the center of a coil core so that the transmitter and receiver operate a common axis. DE 43 44 071 A1 further describes that it is possible, if such a device is installed in door hinges, for example, to transmit energy, and therefore also data, without a wiring from the door frame to the door. Possible applications named as examples are: detecting electronic keys, door access controls, alarm systems, and the automatic detection of inductance changes if a door catches.

Using the device described from DE 43 44 071 A1, it is possible to achieve a galvanically isolated power transfer from a wall to a leaf pivotable relative thereto, and also a data exchange via photo-optic signal transmission. So that such a device can be used in combination with a leaf attached to a building wall via a hinge, with sufficient tamper resistance to meet certification, it is, however, necessary to provide a particularly reliable signal and power transmission.

SUMMARY

An aspect of the present invention is therefore to provide an improved method and a device to carry out the method.

In an embodiment, the present invention provides a method for transmitting electrical power, first signals and second signals between a wall and a leaf pivotable relative to the wall to supply an electric consumer arranged on the leaf with an electrical actuating power depending on the actuating state thereof, and to supply an electrical signal transmitter arranged on the leaf with an electrical operating power. The method includes providing the leaf comprising the electric consumer and the electrical signal transmitter, providing a control and evaluation unit on the wall, providing a single power transmitting device, providing a first optocoupler configured to transmit the first signals, and providing a second optocoupler configured to transmit the second signals. The electrical actuating power and the electrical operating power are transmitted from the wall to the leaf in a galvanically isolated manner via the single power transmitting device. The first signals are transmitted from the leaf to the wall via the first optocoupler so as to regulate the electrical power supplied on the wall according to an actuating and operating power demand. The second signals are transmitted bidirectionally between the control and evaluation unit on the wall and the electric signal transmitter on the leaf via the second optocoupler.

BRIEF DESCRIPTION OF THE DRAWINGS

The present invention is described in greater detail below on the basis of embodiments and of the drawings in which.

DETAILED DESCRIPTION

Figure 1:
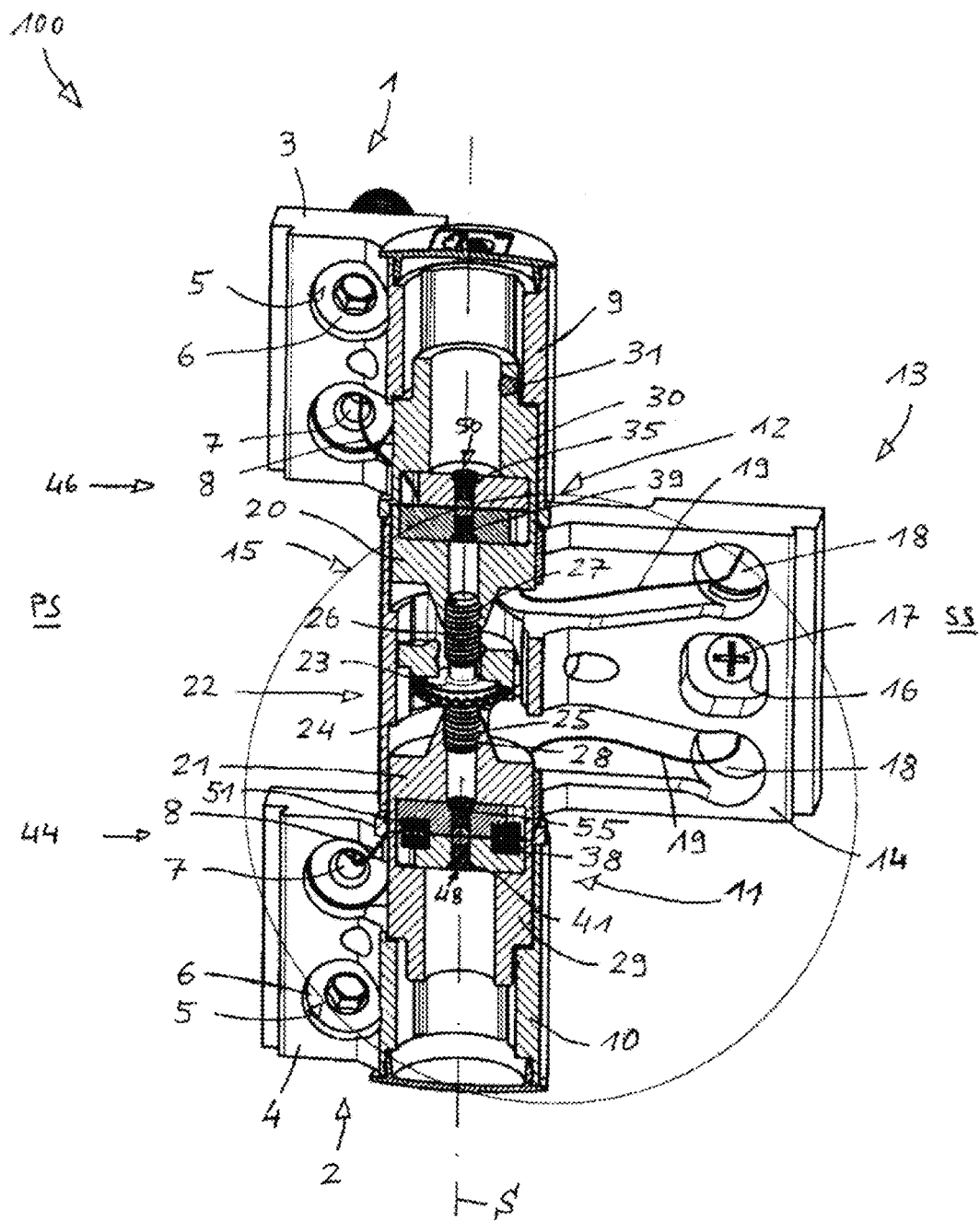
FIG. 1 shows an embodiment of the device according to the present invention in a partial longitudinal cutaway view.

In the method according to the present invention for transmitting electrical power and signals between a wall and a leaf which is pivotable relative thereto, electrical consumers on the leaf are supplied with electrical operating power depending on the operating state thereof. The term "electrical consumers" is in particular used to mean devices which consume electrical power substantially according to their operating states so that the consumption varies considerably. Examples include motor locks, door openers, and lighting equipment. With the inventive method, electrical signal transmitters on the leaf are also supplied with electrical operating power. The term "electrical signal transmitters" is in particular used to mean transmitters which require substantially constant electrical power for their operation, such as glass breakage sensors, magnetic contacts for closure monitoring, etc. Both the actuating power and the operating power are transmitted in the method according to the present invention with galvanic isolation via a single transmitter from the wall to the leaf. To regulate the electrical power provided on the wall according to actuation and operation requirements, in the method according to the invention, signals are transmitted from the leaf to the wall by a first optocoupler. The first optocoupler is, in other words, part of a likewise galvanically isolated control loop.

The first optocoupler is used to transmit signals from the leaf to the wall only to provide electrical power as needed so that the actuating and operating power is regulated and provided without creating interference. In contrast, bidirectional signals are transmitted completely independently by the second optocoupler between a control and evaluation device on the wall and the signal transmitters so that they cannot be adversely affected by an interaction with other signals.

The electrical power can in particular be transferred inductively.

The device which is suitable for carrying out the method according to the present invention comprises a power transmitting device which has an arrangement to galvanically isolate the transmission of the electrical power, as well as a first optocoupler to transmit signals from the leaf to the wall for the purpose of regulating the electrical power provided by the first power transmission device according to the total power demand from the equipment on the leaf. Via the control loop completed by the optocoupler, the electrical power provided to the first power transmission device is regulated according to the total electrical power demand of the equipment on the leaf. It is thereby possible to reduce the power dissipation loss of the device according to the present invention and to prevent an undesired heating of components of the device. The first optocoupler is used according to the present invention only to form the control loop to provide the total electrical power as needed by the equipment on the leaf.

The device according to the present invention further comprises a second optocoupler to bidirectionally transmit signals between the wall and the leaf. A control and evaluation device can be included on the wall, for example, which exchanges bidirectional signals with signal transmitters on the leaf, to read the operating state (signal transmission from the leaf to the wall), for example, or to control the signal transmitter (signal transmission from the wall to the leaf).

The power transmission device can have a primary coil arrangement and a secondary coil arrangement. The power transmission is then inductive and galvanically isolated.

In an embodiment of the present invention, the primary and secondary coil arrangements can, for example, be arranged so that the coil windings of the primary and the secondary coil arrangements are located approximately on the same straight line.

In an embodiment of the device according to the present invention, the coil windings of the primary and secondary coil arrangements can, for example, have approximately the same diameter and, with the exception of a spacing gap which is as small as possible, adjoin each other in the direction of the straight line, for example, indirectly.

Since the first optocoupler only transfers signals from the leaf to the wall, specifically those that characterize the total power demand of the equipment on the leaf, the first optocoupler can have a transmitter device (which only transmits) on the leaf, and a receiver device (which only receives) on the wall.

Because signals must be regularly transmitted bidirectionally between a control and evaluation device on the wall and signal transmitters on the leaf, the second optocoupler in contrast has one transmitter/receiver device on the leaf, and another on the wall.

Both the first and the second optocouplers can have light-emitting diodes. In the case of the second optocoupler, two bidirectional (i.e., functioning either as a transmitter or as a receiver) light-emitting diode arrangements can be used.

The present invention is explained further below under reference to the drawings which illustrate an embodiment of a device according to the present invention.

The device, indicated as a whole in FIG. 1 by the number 100, has two wall (or strap) parts 1, 2 which can be fixed on a wall (not shown in the drawings), spaced apart along a hinge axis S, said wall having a door or window opening. The preceding or subsequent use of the term "wall" shall include a frame or a casing which is commonly configured in the region of a door or window opening on the wall.

The wall parts 1, 2 have fastening parts 3, 4. Each fastening part 3, 4 has a bore hole 5 for receiving a fastening screw 6, and a bore hole 7 for the routing of electrical and/or optical cables 8, which are only indicated in FIG. 1 and which establish the electrical or optical connection of power or signal transmitters and associated electronic or optoelectronic circuits, as will be described in more detail below.

The wall forms typically a primary side PS, wherein the electrical power is transmitted to the leaf therefrom, and the leaf then being the secondary side SS.

One receiving part 9, 10 is molded onto each of the fastening parts 3, 4 to receive components of power and signal transmission modules 11, 12. In the embodiment here described, the power and signal transmission modules 11, 12 form power and signal transmission devices 44, 46.

The device 100 also comprises a leaf part 13 which engages in the space formed between the wall parts 1, 2. It also has a fastening part 14 and a receiving part 15 which is molded onto the fastening part 14. A bore hole 16 for a fastening screw 17 is included in the fastening part 14. The leaf part 13 can be mounted via the fastening part 14 on a leaf (not shown in the drawing). The fastening part 14 also has other holes 18, such as a bore hole, which serve the purpose of routing electrical and/or optical cables 19, which in turn are only represented schematically in the drawing. These cables 19 are used to connect the power and signal transmission modules 11, 12 to electronic or optoelectronic circuits on the leaf—in this case, the primary electronic device 60 and the secondary electronic device 75.

The receiving part 15 is used to receive components of the power and signal transmission modules 11, 12 on the leaf. These leaf components include two bearing sleeves 20, 21 which are spaced apart from each other along the hinge axis S and are able to slide relative to each other in this direction. A spindle drive 22 serves the purpose of displacement and fixation in a desired position. It comprises an adjusting spindle 23 which has a central crown gear 24. This crown gear 24 allows for an optional application of a turning tool (not shown in the drawing) or the engagement of a rotary actuator (also not shown in the drawing). The adjusting spindle 23 also has two threaded regions 25, 26 which comprise external threads in opposite directions. The threaded regions 25, 26 engage in complementary internal threads 27, 28 of the bearing sleeves 20, 21. By rotary actuation of the spindle drive 22, the bearing sleeves 20, 21 can therefore be displaced along the hinge axis S to thereby move between an installation position in which the bearing sleeves 20, 21 have a minimum spacing and an operating position in which the bearing sleeves 20, 21 at least essentially lies against bearing sleeves 29, 30 in the receiving parts 9, 10 of the wall parts 1, 2.

Figure 2:
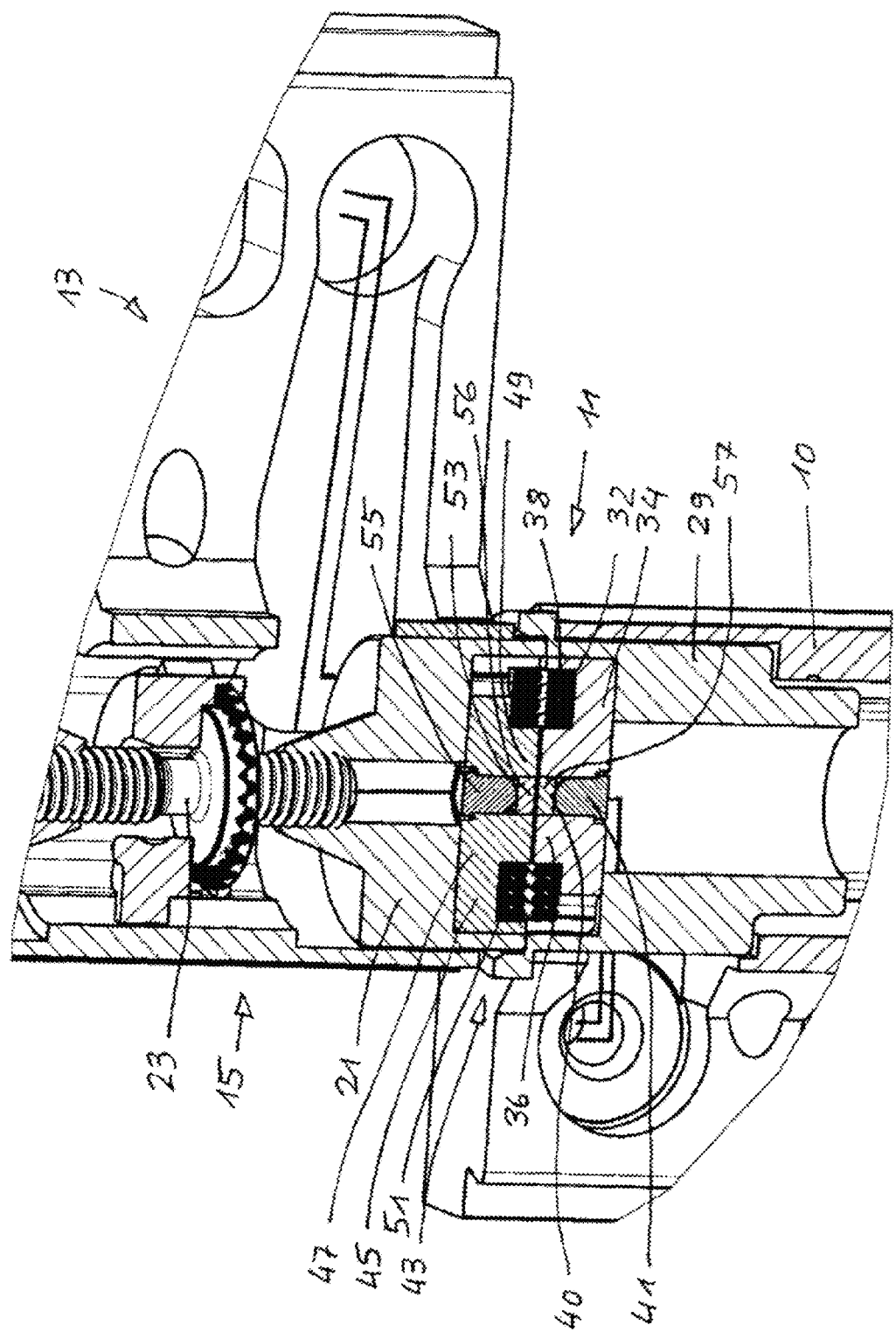
FIG. 2 shows details of the circled area in FIG. 1 in an enlarged view.

The construction and functionality of the power and signal transmission modules will be explained below with reference to FIGS. 2 to 4.

The power transmission module 11 comprises, in addition to the bearing sleeve 21, which is mounted in the receiving part 15 of the leaf part 13 via the adjusting spindle 23 in a manner to allow sliding, the bearing sleeve 29, which is arranged in the receiving part 10. The functionally corresponding bearing sleeve 30 is accordingly arranged in the receiving part 9 of the (upper) wall part 1 (see FIG. 1). The bearing sleeves 29, 30 are not allowed to move along the hinge axis S. The upper bearing sleeve 30 includes a radially projecting clamping device 31 so that it is mounted in a manner to allow rotation and does not automatically fall out in the event the leaf part 13 is removed.

The bearing sleeve 29 comprises a primary coil arrangement 32. It comprises a coil housing 34 which can consist of a soft-magnetic, particularly ferritic, material. It has a central core 36 around which is routed a coil winding 38. A central bore hole 40 is configured in the central core 36. The central bore hole 40 serves to receive a phototransistor 41, which is part of a first optoelectronic signal transmission device 43. The bearing sleeve 29 is configured in the bearing sleeve 30 in a corresponding manner with a clamping device (not shown in the drawing).

A secondary coil arrangement 45 is arranged in the bearing sleeve 21 included in the receiving part 15 of the leaf part 13. It comprises a coil housing 47 with a core 49, around which is wound a secondary coil winding 51.

The secondary coil housing 47 in turn has a central bore hole 53 which extends through the core 49. The function of the bore hole 53 is to receive a light-emitting diode (LED) 55, which need not necessarily work in the visible light range. The wavelength of the emitted, electromagnetic radiation (and/or visible or invisible light) is rather adjusted to the photo transistor 41. The light-emitting diode 55 belongs to the primary part of the first optoelectronic signal transmission device 43, and forms a first optocoupler 48 together with the phototransistor 41.

To improve the optical coupling of the light-emitting diode 55 to the phototransistor 41, fiber optic inserts 56, 57 are included which are inserted into the bore holes 40, 53 from the sides of the coil housing 47 which face each other, and lie approximately flush with the sides of the coil housing 47 which face each other.

Figure 3:
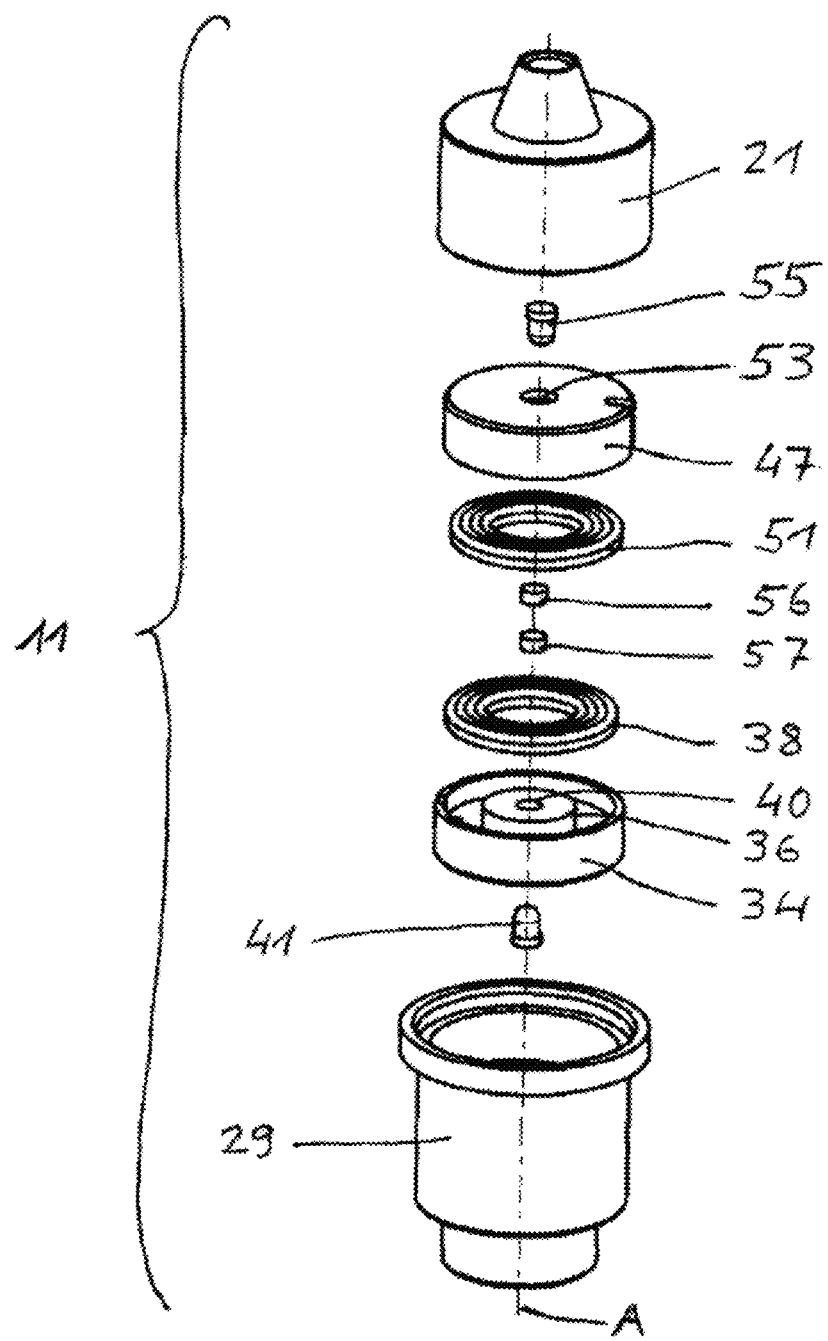
FIG. 3 shows an exploded perspective view of a power transmission arrangement comprising the power transmission device and the first optocoupler.

As in FIG. 3, which shows the power transmission module 11 in a perspective exploded view, the components of the power transmission module 11 are arranged approximately symmetrically about a central axis A. Once installed, this central axis A coincides approximately with the hinge axis S.

Figure 4:
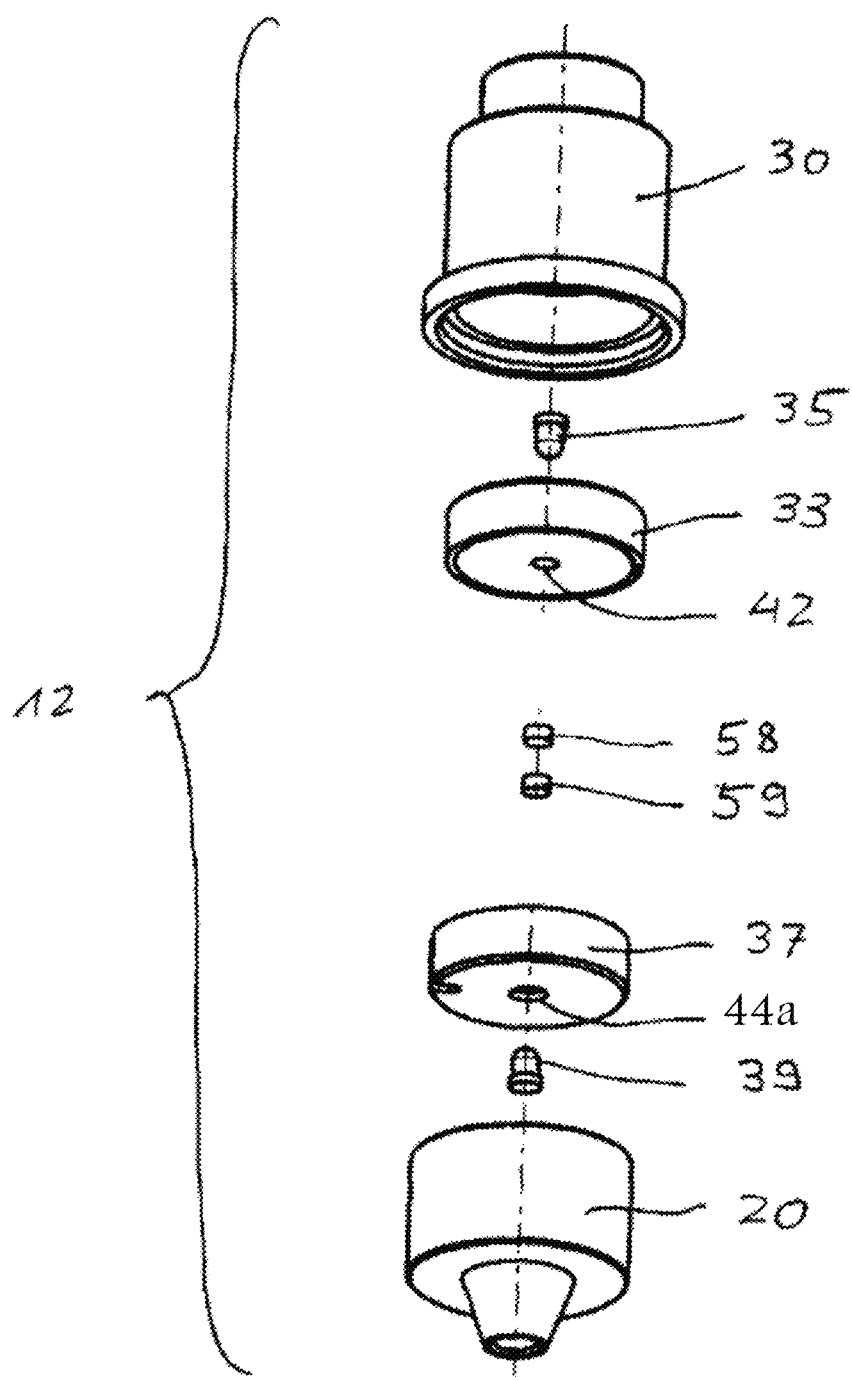
FIG. 4 shows an exploded perspective view of a signal transmission module comprising the second optocoupler.

In FIG. 4, the signal transmission module 12 is shown in an illustration approximately corresponding to FIG. 3. It includes the bearing sleeve 30, a first LED carrier 33, a first transmitter/receiver LED array 35, fiber optic inserts 58, 59, a second LED carrier 37, a second transmitter/receiver LED array 39, and the bearing sleeve 20. The first transmitter/receiver LED array 35 and the fiber optic insert 58 are inserted into a central bore hole 42 of the first LED carrier 33, and the second transmitter/receiver LED array 39 and the fiber optic insert 59 are inserted into a bore hole 44a of the second LED carrier 37. The first and second transmitter/receiver LED arrays together form a second optocoupler 50.

The signal transmission module 12 does not comprise any coil arrangements. The first and second LED carriers 33, 37 can be made of a plastic material.

Figure 5:
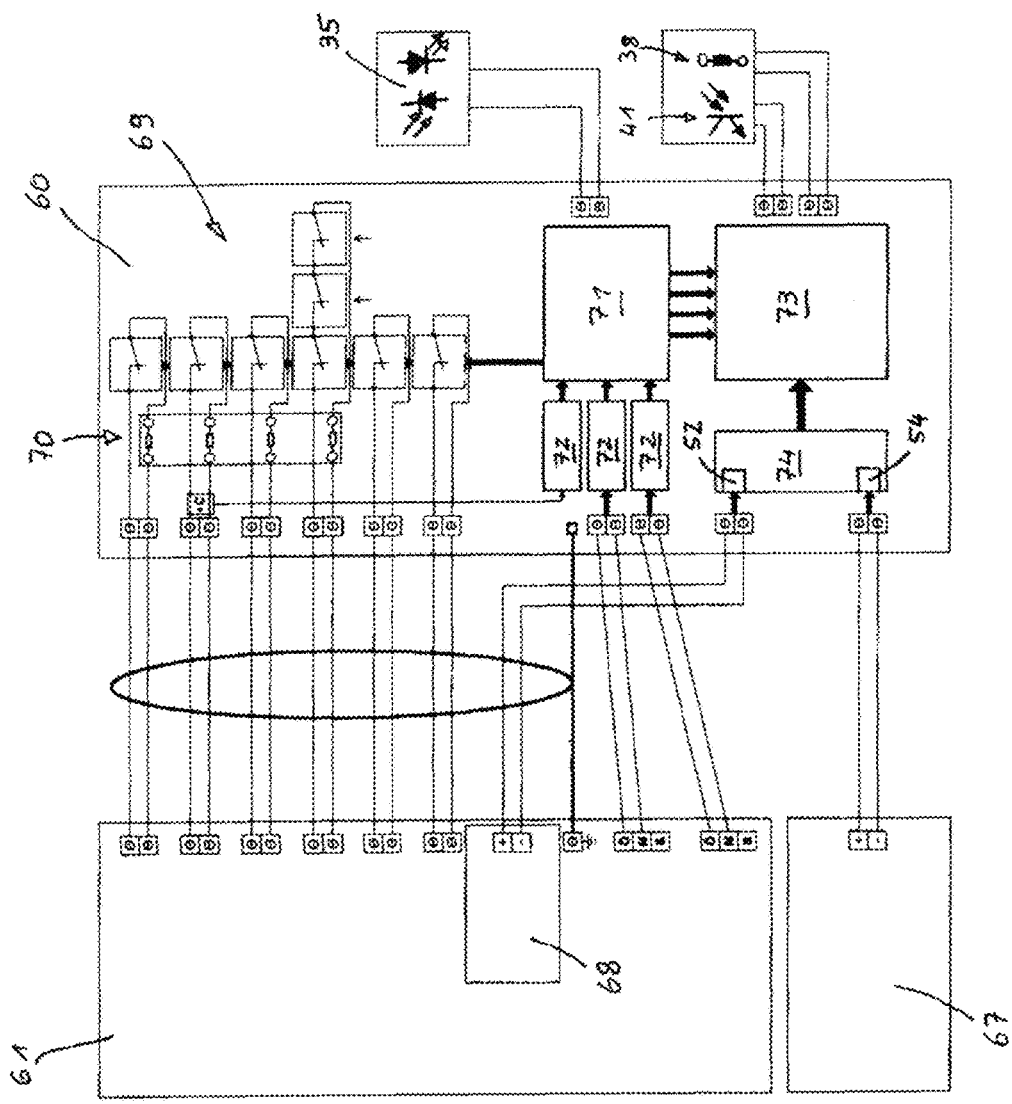
FIG. 5 shows a block diagram of an electrical circuit on the wall.
Figure 6:
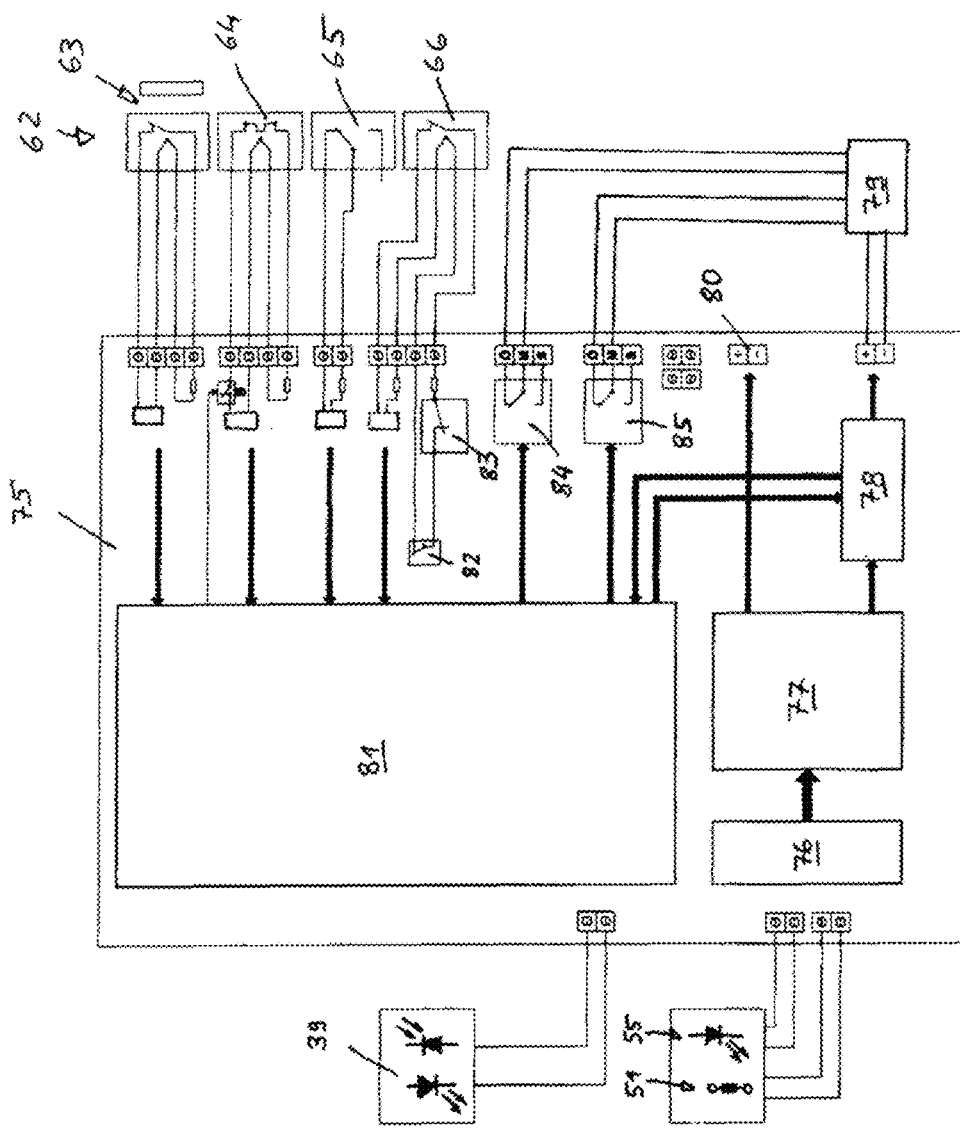
FIG. 6 shows a block diagram of an electrical circuit on the leaf.

The circuit on the frame, illustrated in FIG. 5 as a block diagram, comprises a primary electronic device 60 which serves, for example, to provide electrical power according to the actuation and operation demands of the equipment on the leaf. For this purpose, the primary electronic device 60 is electrically connected to both the phototransistor 41 and the coil winding 38 of the primary coil arrangement 32.

To make it possible to transmit signals in both directions between a control and evaluation device on the wall, formed in the shown embodiment by an intrusion alarm panel 61, and the signal transmitters 62 in the form of magnetic contacts 63, glass breakage sensors 64, make contacts 65, and tamper contacts 66, the primary electronic device 60 is also connected electrically to the first transmitter/receiver LED array 35.

The primary electronic device 60 is also electrically connected to a power supply circuit 67, which supplies actuating power to the equipment on the leaf on demand, and is electrically connected to a buffered power supply 68 which is part of the intrusion alarm panel 61 and functions to supply operating power to the signal transmitters 62 on the leaf in the event of a supply voltage failure or a technical fault of the power supply circuit 67. The power supply circuit 67 may be omitted if no consumers are on the leaf.

The primary electronic device 60 also includes a plurality of relays 69 which forward signals from an opening, breakthrough, closing, and tamper monitor. The relays 69 are connected to the corresponding inputs of the intrusion alarm panel, wherein terminating resistors 70 are connected in series to the connecting lines. Relays 69 are also included for a cover contact and a lifting contact, and to transmit malfunctions detected by a "watch dog."

The relays 69 are controlled by a processor 71 of the primary electronic device 60 according to the signals received by the first transmitter/receiver LED array. The processor 71 receives information via evaluation electronics 72 about the alarm group voltage, and receives signals from the intrusion alarm panel 61, for example, for a mortise deadlock control.

The processor 71 is also connected to a switching converter 73 which applies electrical power to the coil winding 38 according to the determined power demand of the processor 71, with a feedback via the phototransistor 41.

This electrical power is supplied to the switching converter 73 via a switch 74 when the power supply circuit 67 is operating normally, or, in the event of supply voltage failure, is supplied by the buffered power supply 68. The switch 74 has a first electrical energy buffer 54. These energy buffers 54 are used to supply the actuating power to the leaf in the event that the supply voltage fails during an actuation process of a consumer 79. This prevents the interruption of the actuation process in the event that the supply voltage fails during the process. Essentially, as long as a consumer 79 is present, both the actuating power to the leaf and the operating power to the leaf are supplied via the power supply circuit 67. Only in the event of a failure of the supply power provided by the power supply circuit is a switch made, via switch 74, to the buffered power supply. Uninterrupted operation of safety-related secondary circuit components is therefore provided. The approach to the supply of electrical power to the primary electronic device via the switch 74, described above, can be used regardless of the other details of the design of the device 100 to increase operational reliability for a galvanically isolated supply of electrical power to an electrical consumer on a leaf. As such, the method described above for switching between a power supply circuit and a buffered power supply in the event of a failure of the supply power, and also the configuration of a primary electronic device with a switch having two electrical energy buffers, independently involve inventive significance.

To convert the electrical DC current supplied by the switch 74 to the switching converter 73 into an alternating current voltage suitable for supplying the primary coil winding 38, and thus for transmission by induction of a secondary alternating current voltage in the secondary coil winding 51 of the secondary coil arrangement 45, the switching converter 73 comprises a special variant of a flyback converter. This comprises an H-bridge having four high-power MOSFETs. The MOSFETs are controlled via MOSFET drivers that are controlled by an intelligent logic. A controller which is optimized for this application is used here, thereby achieving both the intelligent rapid control of the H-bridge, and the program sequence to monitor and control all functions of the secondary electronic device 75 independently of each other, and in a confined space. The controller can thereby influence the control of the H-bridge in its program sequence, but a retroactive influence of the control of the H-bridge on the program sequence of the controller is ruled out.

The secondary coil winding 51 is electrically connected to the secondary electronic device 75 on the leaf. A rectifier 76 is supplied with this alternating current voltage, which rectifies this alternating current voltage. This DC voltage is supplied to a power supply 77 of the secondary electronic device 75, smoothed via a buffer. To this power supply 77 is connected, among other things, an overcurrent detection and load isolation circuit 78. The overcurrent detection and load isolation circuit 78 comprises a power output, wherein electrical consumers 79 on the leaf can be connected thereto.

The power supply 77 also comprises a stabilized, short-circuit protected DC voltage output 80, to which can be connected, for example, seismic detectors, the same supplied with operating voltage.

A processor 81 is provided with the necessary operating power via power supply 77. The processor 81 is also connected via a signal line to the overcurrent detection and load isolation circuit 78 to disconnect loads if necessary.

A second transmitter/receiver LED array and the light-emitting-diode 55 are also connected to the secondary electronic device 75.

During operation of the arrangement, the coil winding 38 of the primary coil arrangement 32 is supplied with the electrical power by the switching converter 73, the electrical power being required to supply the actuating and operating power as required in the secondary coil winding 51 of the secondary coil arrangement 45. The regulation is implemented by a unidirectional return channel which is galvanically isolated by the light-emitting-diode 55 and the phototransistor 41, and which acts directly in hardware on the control of the H-bridge of the switching converter 73. With this type of regulation, a flyback converter is used exclusively in hardware, requiring no software-controlled program sequence with corresponding delay/response times. Operating states may, however, arise in which the on/off switching frequency of the flyback converter is in the audible range. In this case, the control frequency can be changed by the controller using software. An operating state may also arise in which the system would go into an overload state without software control. Such an operating state can also be prevented by switching off the flyback converter using software.

During operation, a bidirectional signal transmission also takes place via the first and second transmitter/receiver LED arrays 35, 39. The operating states of the signal transmitters 62 of the intruder alarm panel 61 can thereby be registered, and the processor 81 and the signal transmitters, as well as optionally other consumers, can be controlled by the intrusion alarm panel 61.

The secondary electronic device further comprises a safety contact 82 for a cover monitoring and a safety contact 83 for a lift protection. Relays 84, 85 are also included for a mortise deadlock control of the consumer 79 designed as a motor lock.

Any remotely actuatable switches can be considered as the relay. In the described embodiment, the switches function optoelectronically.

The present invention is not limited to embodiments described herein; reference should be had to the appended claims.

LIST OF REFERENCE NUMBERS

100 device
1,2 wall parts/strap parts
3,4 fastening parts
5 bore hole
6 fastening screw
7 bore hole
8 cable
9,10 receiving part
11 power transmission module
12 signal transmission module
13 leaf part
14 fastening part
15 receiving part
16 bore hole
17 fastening screw
18 bore hole
19 cable
20,21 bearing sleeves
22 spindle drive
23 adjusting spindle
24 crown gear
25,26 external threads/threaded region
27,28 internal threads
29,30 bearing sleeves
31 clamping device
32 primary coil arrangement
33 first LED carrier
34 coil housing
35 first transmitter/receiver LED array
36 central core
37 second LED carrier
38 coil winding
39 second transmitter/receiver LED array
40 central bore hole
41 phototransistor
42 bore hole
43 first optoelectronic signal transmission device
44 signal transmission device
44a bore hole
45 secondary coil arrangement
46 signal transmission device
47 coil housing
48 first optocoupler
49 core
50 second optocoupler
51 secondary coil winding
52 buffer
53 bore hole
54 first electric energy buffer
55 light-emitted-diode (LED)

56,57 fiber optic inserts
58,59 fiber optic inserts
60 primary electronic device
61 intrusion alarm panel
62 signal transmitter
63 magnetic contacts
64 glass breakage sensors
65 make contacts
66 tamper contacts
67 power supply circuit
68 buffered power supply
69 relay
70 monitoring resistors/terminating resistors
71 processor
72 evaluating electronics
73 switching converter
74 switch
75 secondary electronic device
76 rectifier
77 power supply
78 overcurrent detection and load isolation circuit
79 consumers
80 DC output
81 processor
82 safety contact
83 safety contact
84 relay
85 relay
A central axis
PS primary side
S hinge axis
SS secondary side

What is claimed is:

1. A method for transmitting electrical power, first signals and second signals between a wall and a leaf pivotable relative to the wall to supply an electric consumer arranged on the leaf with an electrical actuating power depending on the actuating state thereof, and to supply an electrical signal transmitter arranged on the leaf with an electrical operating power, the method comprising:
providing the leaf comprising,
the electric consumer, and
the electrical signal transmitter;
providing a control and evaluation unit on the wall;
providing a single power transmitting device;
providing a first optocoupler configured to transmit the first signals;
providing a second optocoupler configured to transmit the second signals;
transmitting the electrical actuating power and the electrical operating power from the wall to the leaf in a galvanically isolated manner via the single power transmitting device;
transmitting the first signals from the leaf to the wall via the first optocoupler so as to regulate the electrical power supplied on the wall according to an actuating and operating power demand; and
transmitting the second signals bidirectionally between the control and evaluation unit on the wall and the electrical signal transmitter on the leaf via the second optocoupler.

2. The method as recited in claim 1, wherein the electrical power is transmitted inductively between galvanically isolated units.

3. A device for transmitting electrical power, first signals and second signals between a wall and a leaf pivotably attached to the wall, the device comprising:
a power transmission device comprising an arrangement to transmit the electrical power in a galvanically isolated manner, the arrangement comprising:
a first optocoupler configured to transmit the first signals from the leaf to the wall so as to regulate the electrical power supplied to the power transmission device according to a total electrical power demand of equipment on the leaf; and
a second optocoupler configured to transmit the second signals bidirectionally between the wall and the leaf.

4. The device as recited in claim 3, wherein the power transmission device comprises a primary coil arrangement and a secondary coil arrangement.

5. The device as recited in claim 4, wherein,
the primary coil arrangement comprises first coil windings which comprise a central longitudinal axis,
the secondary coil arrangement comprises second coil windings which comprise a central longitudinal axis, and
the central longitudinal axis of the first coil windings and the central longitudinal axis of the second coil windings are arranged to lie approximately on a same straight line.

6. The device as recited in claim 5, wherein,
the first coil windings further comprise a first diameter,
the second coil windings further comprise a second diameter,
the first diameter of the first coil windings is substantially the same as the second diameter of the second coil windings, and
the first coil windings and the second coil windings are configured to adjoin each other in a direction of the same straight line.

7. The device as recited in claim 6, wherein the first coil windings and the second coil windings are configured to adjoin each other in a direction of the same straight line as closely as possible.

8. The device as recited in claim 6, wherein the first coil windings and the second coil windings are configured to adjoin each other indirectly in the direction of the same straight line.

9. The device as recited in claim 3, wherein the first optocoupler comprises a transmitter device arranged on the leaf and a receiver device arranged on the wall.

10. The device as recited in claim 9, wherein the first optocoupler further comprises at least one of a light-emitting diode, a photo-diode, and a phototransistor.

11. The device as recited in claim 3, wherein the second optocoupler comprises a first transmitter/receiver device arranged on the leaf, and a second transmitter/receiver device arranged on the wall.

12. The device as recited in claim 11, wherein the second optocoupler further comprises at least one of a light-emitting diode, a photo-diode and a phototransistor.

13. A device for transmitting electrical power and signals between a wall and a leaf pivotable relative to the wall, the device comprising:
a power transmission device comprising,
an arrangement configured to transmit the electrical power from the wall to the leaf in a galvanically isolated manner, the arrangement comprising,
a first optocoupler configured to transmit the first signals from the leaf to the wall so as to regulate the electrical power supplied to the power transmission device according to a total electrical power demand of equipment on the leaf, and a second optocoupler configured to transmit the second signals bidirectionally between the wall and the leaf; and a switch which comprises a first electrical energy buffer at a first input and a second electrical energy buffer at a second input, the switch being configured to switch between the first input and the second input, wherein, the power transmission device is connected to a primary electronic device, the first input is connected to a power supply circuit, and the second input is connected to a buffered power supply of an intrusion alarm panel.

* * * * *